US012604125B2

(12) United States Patent
Theien

(10) Patent No.: US 12,604,125 B2
(45) Date of Patent: Apr. 14, 2026

(54) DETECTING ACTIVE SPEAKERS USING HEAD DETECTION

(71) Applicant: Cisco Technology, Inc., San Jose, CA (US)

(72) Inventor: Christian Fjelleng Theien, Asker (NO)

(73) Assignee: CISCO TECHNOLOGY, INC., San Jose, CA (US)

( * ) Notice: Subject to any disclaimer, the term of this patent is extended or adjusted under 35 U.S.C. 154(b) by 282 days.

(21) Appl. No.: 18/366,824

(22) Filed: Aug. 8, 2023

(65) Prior Publication Data

US 2025/0056145 A1 Feb. 13, 2025

(51) Int. Cl.

| | |
|---|---|
| ***H04R 1/08*** | (2006.01) |
| ***H04M 3/56*** | (2006.01) |
| ***H04M 9/08*** | (2006.01) |
| ***H04N 7/14*** | (2006.01) |
| ***H04N 7/15*** | (2006.01) |
| ***H04R 1/32*** | (2006.01) |
| ***H04R 3/00*** | (2006.01) |
| ***H04R 27/00*** | (2006.01) |

(52) U.S. Cl.

CPC ............ *H04R 1/08* (2013.01); *H04S 2400/11* (2013.01)

(58) Field of Classification Search

None

See application file for complete search history.

(56) References Cited

U.S. PATENT DOCUMENTS

| | | | |
|---|---|---|---|
| 8,848,030 B2 | 9/2014 | Solvang | |
| 9,633,270 B1 | 4/2017 | Tangeland et al. | |
| 9,686,605 B2 | 6/2017 | Sun | |
| 9,838,646 B2 | 12/2017 | Burenius | |
| 11,115,625 B1 | 9/2021 | Stuan et al. | |
| 2005/0008169 A1 | 1/2005 | Muren et al. | |
| 2015/0078581 A1 | 3/2015 | Etter et al. | |
| 2020/0145753 A1 * | 5/2020 | Rollow, IV | H04R 1/406 |
| 2023/0119874 A1 | 4/2023 | Tjøntveit et al. | |
| 2024/0137702 A1 * | 4/2024 | Thumerel | G01S 3/8083 |

FOREIGN PATENT DOCUMENTS

| | | |
|---|---|---|
| CN | 111343411 A | 6/2020 |
| KR | 20180073168 A | 7/2018 |

* cited by examiner

*Primary Examiner* — Qin Zhu

(74) *Attorney, Agent, or Firm* — Edell, Shapiro & Finnan, LLC

(57) ABSTRACT

Audio samples are obtained from a plurality of microphones in a conference room that includes a plurality of participants of an online communication session. A cross correlation is calculated between audio samples for each microphone pair of the plurality of microphones. For each participant, a distance between the participant and each microphone is estimated and, for each microphone pair, an expected delay between when microphones in a microphone pair receive audio from a participant is calculated based on the distance. For each participant, a score is computed based on the cross correlation for each microphone pair and the expected delay for each microphone pair and the participant that is speaking is identified based on the score computed for each participant.

20 Claims, 8 Drawing Sheets

DETECTING ACTIVE SPEAKERS USING HEAD DETECTION

TECHNICAL FIELD

The present disclosure relates to detecting active speakers during online video meetings/videoconferences.

BACKGROUND

When a participant is speaking during an online video meeting or conference, it may be beneficial for a camera to track the speaker or capture a closeup of the speaker while the speaker is speaking. When a participant is speaking in a conference room with more than one participant, a speaker tracking system may be used to determine which participant is speaking and to automatically compose a framing with the camera that captures the speaker. Current speaker tracking systems sometimes make mistakes when trying to detect who is speaking, which can lead to automatic framing decisions that are less than ideal.

DESCRIPTION OF EXAMPLE EMBODIMENTS

Overview

Figure 1:
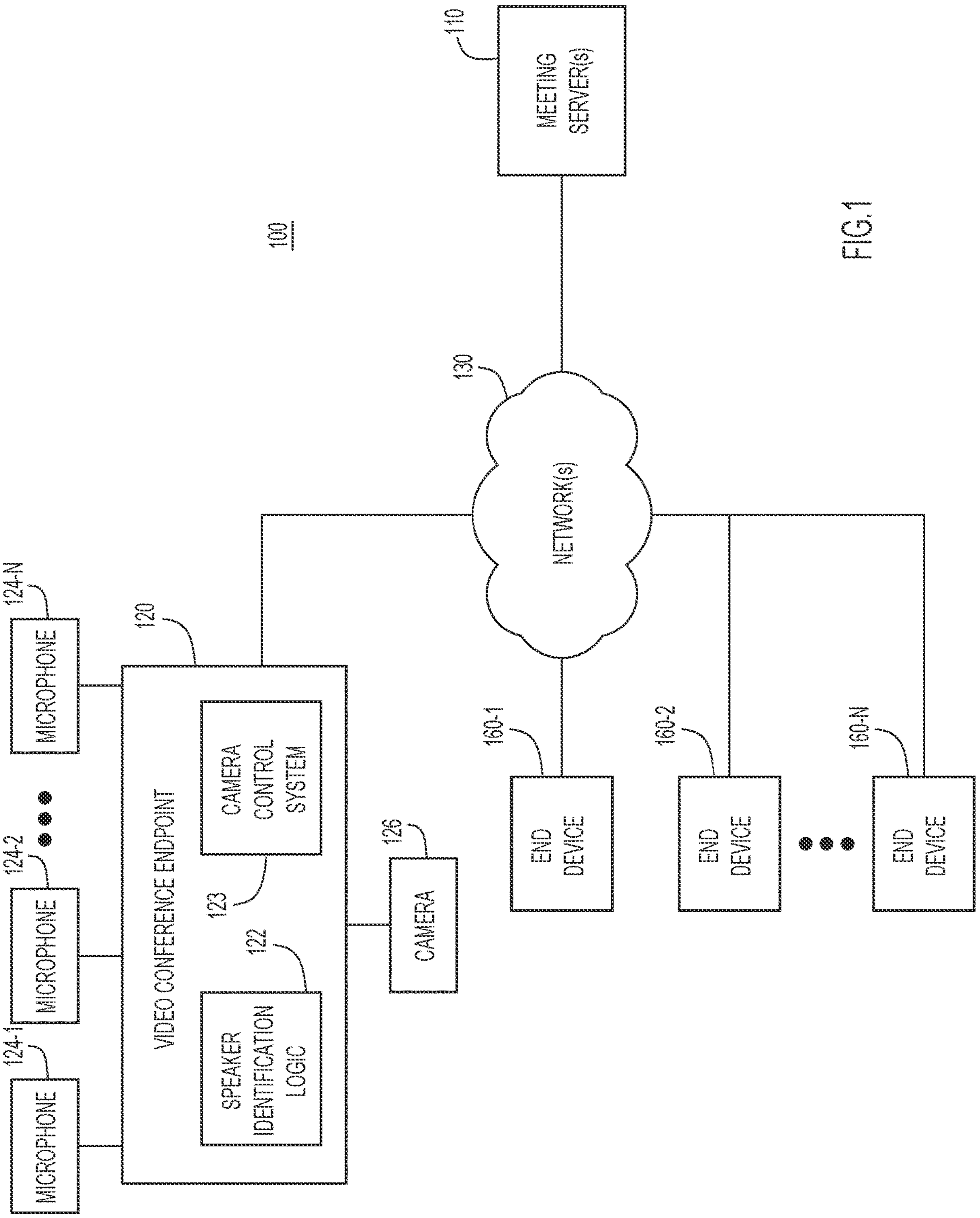
FIG. 1 is a block diagram of an online video conference/meeting system configured to support identifying a speaker in a conference room, according to an example embodiment.

In one embodiment, a computer-implemented method is provided for identifying which participant is speaking in a conference room. The method includes obtaining audio samples from a plurality of microphones in a conference room, the conference room including a plurality of participants of an online communication session; calculating a cross correlation between audio samples for each microphone pair of the plurality of microphones; for each participant, estimating a distance between the participant and each microphone; for each participant and for each microphone pair, calculating, based on the distance, an expected delay between a first time when audio of the participant reaches a first microphone and a second time when the audio of the participant reaches a second microphone of the microphone pair; for each participant, computing a score based on the cross correlation for each microphone pair and the expected delay for each microphone pair; and identifying the participant, of the plurality of participants, that is speaking based on the score computed for each participant.

Example Embodiments

During a videoconference, when a participant is speaking from a meeting room that includes multiple participants, it may be helpful to transmit a video feed of the meeting room that frames the speaker. In some situations, the camera may automatically track the movements of the speaker to ensure that the speaker is always present in the video feed. In other situations, it may be beneficial to transmit a closeup view of the speaker. A speaker tracking system may be used to determine which participant is speaking and to automatically frame the video feed of the meeting room based on a location of the speaker.

Speaker tracking systems can sometimes make mistakes, which may lead to automatic framing decisions that are less than ideal. For example, based on the speaking tracking system, a camera may take a closeup shot of the wrong participant, a camera may take a closeup of a participant when no participant is speaking (e.g., when there is noise in the room), or the camera may wait too long to zoom in or may not zoom in on the speaker at all.

Presented herein are techniques for using audio triangulation to identify a speaker in a room that includes more than one person using a system that includes at least one camera and at least one pair of sufficiently spaced microphones. The relative position and orientation of the camera and the microphones in the system are known, as well as the intrinsic parameters of the camera (e.g., focal length, pixel pitch, and optical distortion). Embodiments presented herein use the position and orientation of the camera and microphones and the parameters of the camera to detect the position and size of human heads in the meeting room from the images captured from the camera.

Sound travels slowly enough to enable triangulation of a sound source (e.g., a participant who is speaking) by measuring a difference in a time of arrival of the sound (e.g., the speaker's voice) to a set of sufficiently spaced microphones. Embodiments described herein identify the speaker based on the position of the participants in the meeting room and the difference in time of the arrival of the sound to different microphones to identify the speaker in the room. In particular, embodiments described herein provide for calculating a cross correlation between microphone pairs in a conference room, identifying positions of people in the meeting room, and identifying a speaker based on expected delays between times when each microphone in the microphone pair receives audio from the speaker. The identification of the speaker may be used as an input to an automatic camera control system. Embodiments described herein provide for a robust system that is computationally efficient and can help free up resources for other uses.

Some systems perform a "blind search" that combines cross correlations from multiple microphone pairs into a large set of possible positions in the room and calculates a score for each position. In these systems, the highest scoring position will then be detected as the position of the current speaker (if the score is higher than a predefined threshold). Embodiments presented herein provide several advantages over existing systems by identifying the speaker based on cross correlation values that correspond to known positions of people. For example, the system described herein may not be fooled by audio reflections from tabletops or glass walls, may detect simultaneous speech from multiple people, may be more robust against noise from non-human sources, may be more computationally efficient (since the system will calculate scores at fewer positions), and may be more sensitive, giving better range and/or faster detection of voice.

Reference is first made to FIG. 1. FIG. 1 shows a block diagram of a system 100 that is configured to identify a speaker in a meeting or conference room during an online meeting or videoconference. The system 100 includes one or more meeting server(s) 110, end devices 160-1 to 160-N, and a videoconference endpoint 120. End devices 160-1 to 160-N and videoconference endpoint 120 communicate with meeting server(s) 110 via one or more networks 130. The meeting server(s) 110 are configured to provide an online meeting service for hosting a communication session among videoconference endpoint 120 and end devices 160-1 to 160-N.

The videoconference endpoint 120 may be a videoconference endpoint designed for use by multiple users (e.g., a videoconference endpoint in a meeting room). Videoconference endpoint 120 includes camera 126 and microphones 124-1 to 124-N. Camera 126 and/or microphones 124-1 to 124-N may be connected to videoconference endpoint 120 (e.g., with wires or wirelessly) or may be integrated with videoconference endpoint 120. Camera 126 may be used to capture video of participants in a meeting room and microphones 124-1 to 124-N may be used for capturing audio of the participants in the meeting room (e.g., for transmitting to end devices 160-1, 160-2, . . . 160-N during an online meeting). In some embodiments, microphones 124-1 to 124-N may be placed throughout the conference room (e.g., at known locations and positions) to capture audio in the conference room.

Videoconference endpoint 120 includes speaker identification logic 122 to determine a location of a speaker in the conference room and to provide the location as an input to a camera control system 123. Camera control system 123 may control the camera 126 to automatically compose a framing that includes the speaker, tracks the speaker, or zooms in on the speaker. In some situations, camera control system 123 may control the camera 126 to automatically compose a different framing. Speaker identification logic 122 may identify the location of the speaker in the conference room using audio captured by microphones 124-1 to 124-N, known positions and orientations of microphones 124-1 to 124-N, video captured by camera 126, and known properties of camera 126 (e.g., focal length, pixel pitch, and optical distortion).

To identify a location of a speaker in a meeting room (or to identify which participant in a group of participants is speaking), speaker identification logic 122 may record audio samples simultaneously from all the microphones 124-1 to 124-N in the conference room. For each microphone pair (e.g., microphones 124-1 and 124-2, microphones 124-2 and 124-N, and microphones 124-1 and 124-N), speaker identification logic 122 may calculate the cross correlation between the audio samples. Speaker identification logic 122 may detect a position and size of human heads in the video stream of the meeting room using camera 126 and convert the position and size into estimated three-dimensional (3D) positions of the people in the room (e.g., using the known camera parameters discussed above as well as assumptions about the average size of a human head).

For each person detected, speaker identification logic 122 may estimate the distance to each microphone 124-1 to 124-N, and based on the distance, calculate an expected delay at each microphone pair. The expected delay is a difference between the time when audio of a person reaches the first microphone in the microphone pair and the time when the audio reaches the second microphone in the microphone pair. For each person, the speaker identification logic 122 samples the cross correlations for each microphone pair at the expected delays, and computes a combined score (as further described below). The speaker identification logic 122 identifies the speaker in the meeting room based on the scores calculated for each person in the room.

Each end devices 160-1 to 160-N may be a videoconference endpoint similar to videoconference endpoint 120 or may be a tablet, laptop computer, desktop computer, Smartphone, virtual desktop client, virtual whiteboard, or any user device now known or hereinafter developed. End devices 160-1 to 160-N may have a dedicated physical keyboard or touch-screen capabilities to provide a virtual on-screen keyboard to enter text. End devices 160-1 to 160-N may also have short-range wireless system connectivity (such as Bluetooth™ wireless system capability, ultrasound communication capability, etc.) to enable local wireless connectivity (e.g., with other devices in the same meeting room).

Figure 2:
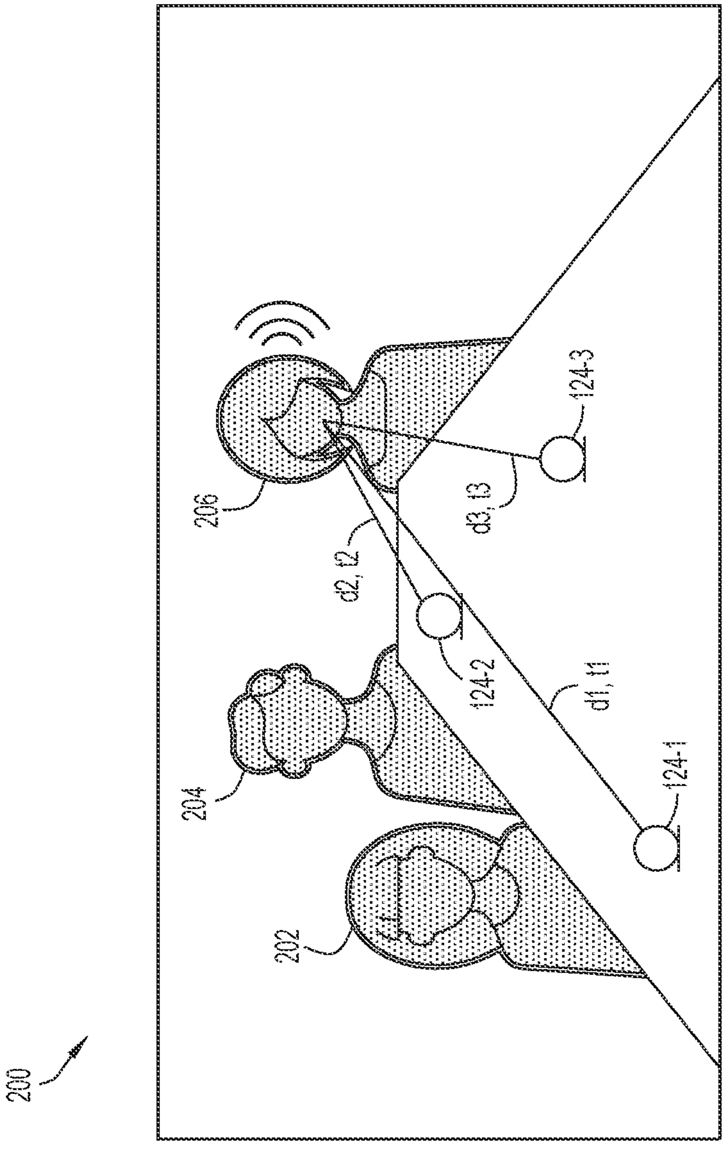
FIG. 2 is a diagram showing an example of identifying a participant who is speaking in a conference room, according to an example embodiment.

Reference is now made to FIG. 2. FIG. 2 illustrates an example environment 200 in which a speaker in a meeting room is identified. Environment 200 includes participants 202, 204, and 206 and microphones 124-1, 124-2, and 124-3 in a meeting room with a videoconference endpoint, such as videoconference endpoint 120 of FIG. 1 (not illustrated in FIG. 2). Microphones 124-1, 124-2, and 124-3 are located in different locations in the meeting room and the positions and orientations of microphones 124-1, 124-2, and 124-3 are known.

To identify which participant is speaking, audio samples are recorded simultaneously from microphones 124-1, 124-2, and 124-3 and cross correlations are calculated between the audio samples for each microphone pair. For example, cross correlations are calculated for microphones 124-1 and 124-2, microphones 124-2 and 124-3, and microphones 124-1 and 124-3. The cross correlation between two audio samples received at two different microphones indicates the degree of relatedness between the two audio samples. The cross correlation for each microphone pair may be plotted on a graph.

Figure 3A:
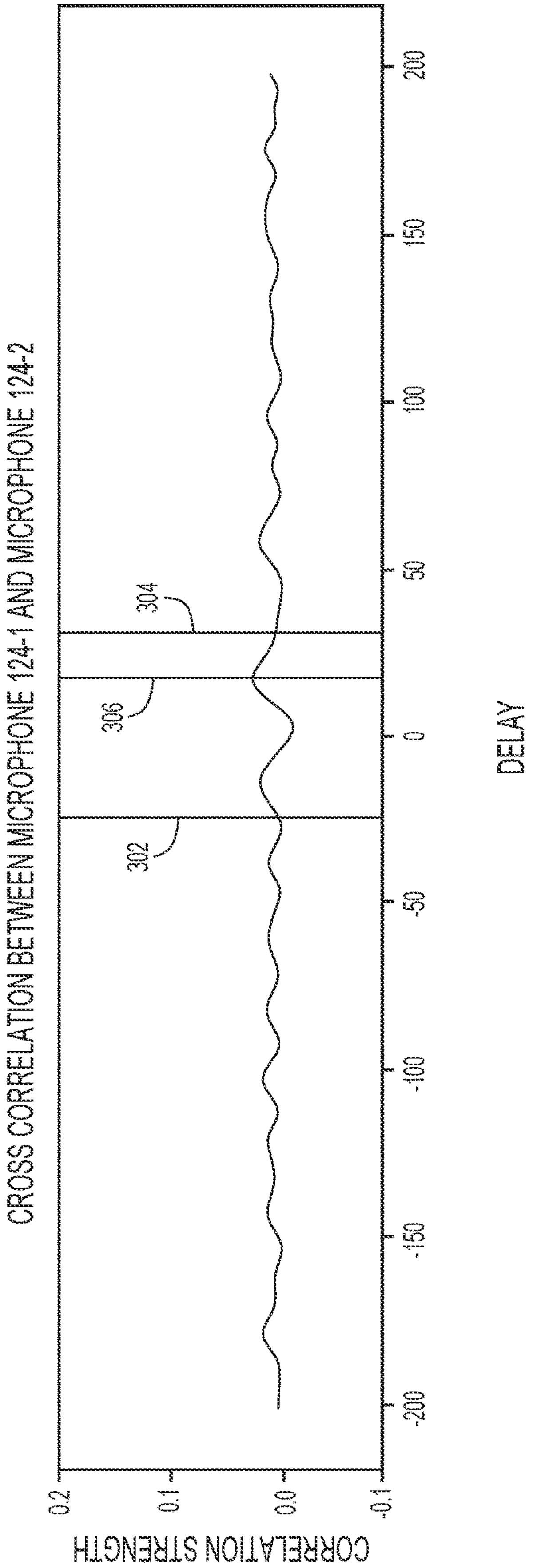
FIGS. 3A-3C show example graphs of cross correlations between microphone pairs, according to an example embodiment.
Figure 3B:
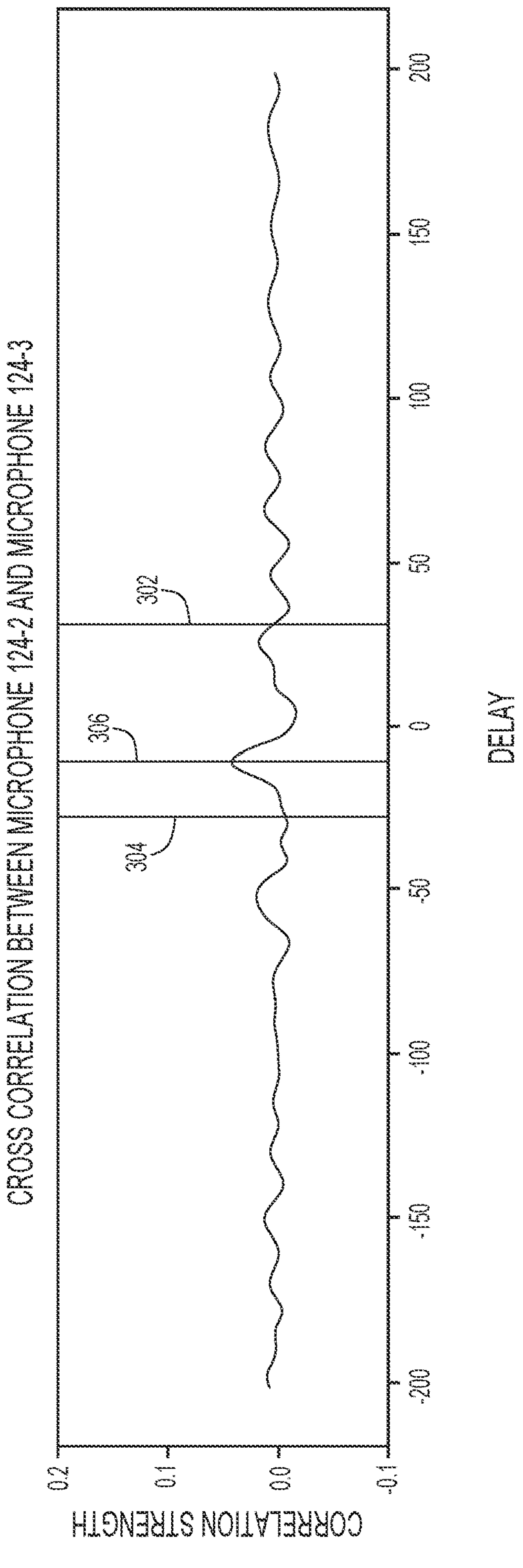
Figure 3C:
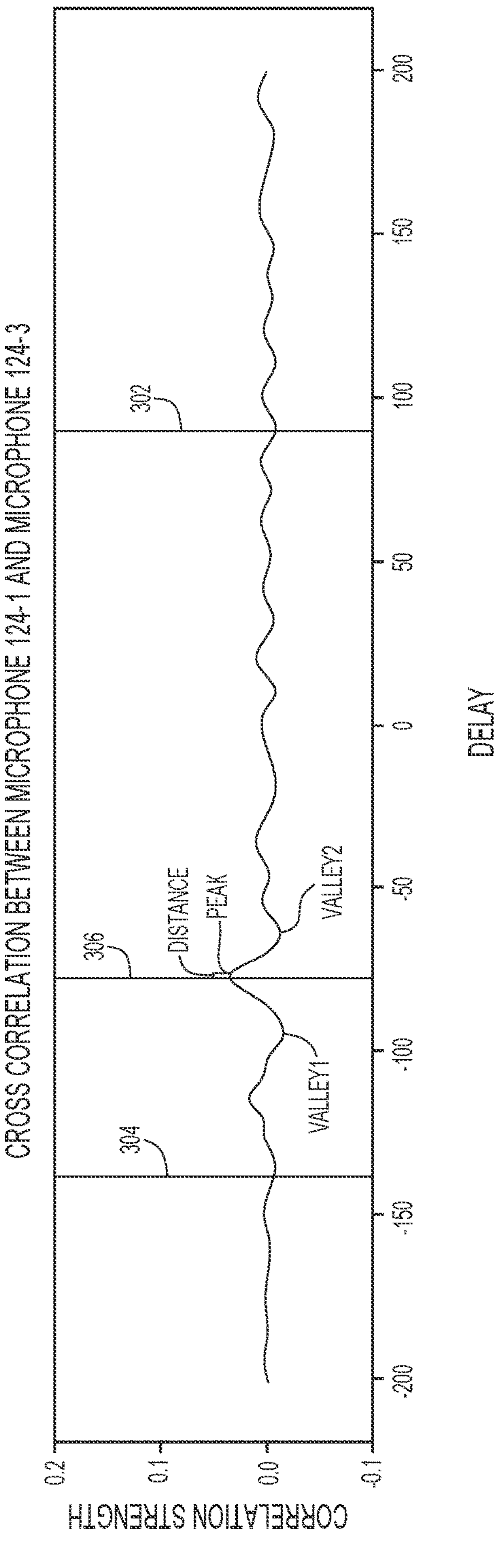

Reference is now made to FIGS. 3A-3C. FIGS. 3A-3C are graphs of cross correlations between microphone pairs at a given point in time. FIG. 3A is a graph illustrating the cross correlation between microphone 124-1 and microphone 124-2, FIG. 3B is a graph illustrating the cross correlation between microphone 124-2 and microphone 124-2, and FIG. 3C is a graph illustrating a cross correlation between microphone 124-1 and microphone 124-3. In the graphs illustrated in FIGS. 3A-3C, the cross correlation plot is generated on a graph in which a delay is on the X-axis and a correlation strength is on the Y-axis.

Returning to FIG. 2, the position and size of the human heads in the meeting room are detected based on the video stream captured by camera 126 (not illustrated in FIG. 2) and converted into estimated 3D positions of the people in the room using known parameters associated with camera 126 (e.g., focal length, pixel pitch, and optical distortion) and assumptions about the average size of the human head. For example, the position and size of the heads of participants 202, 204, and 206 are detected from the video feed of the meeting room and the positions and sizes are converted into estimated 3D positions of the participants 202, 204, and 206.

For each participant 202, 204, and 206, the distance to each microphone 124-1, 124-2, and 124-3 is estimated based on the estimated 3D position of each participant 202, 204, and 206 and the known positions of the microphones 124-1, 124-2, and 124-3. As illustrated in FIG. 2, it is estimated that participant 206 is a distance d1 from microphone 124-1, a distance d2 from microphone 124-2, and a distance d3 from microphone 124-3. Although the distances for only participant 206 are illustrated in FIG. 2 for simplicity, the distances to each microphone 124-1, 124-2, and 124-3 are also estimated for participant 202 and participant 204.

Based on the estimated distance to each microphone, an expected delay at each microphone pair is calculated. Using the speed of sound and the estimated distance to each microphone, an amount of time for each microphone 124-1, 124-2, and 124-3 to receive a sound signal from a participant may be calculated. The expected delay at each microphone pair may be calculated based on the delta between the amount of time it takes for each microphone in the microphone pair to receive the sound signal.

For example, if participant 206 is speaking, it takes a time t1 for the sound to reach microphone 124-1, it takes a time t2 for the sound to reach microphone 124-2, and it takes a time t3 for the sound to reach microphone 124-2. For the microphone pair consisting of microphones 124-1 and 124-2, the expected delay is the difference between time t1 and time t2. For the microphone pair consisting of microphones 124-2 and 124-3, the expected delay is the difference between time t2 and time t3. For the microphone pair consisting of microphones 124-1 and 124-3, the expected delay is the difference between times t1 and t3. Although FIG. 2 illustrates the times only for participant 206, the expected delays are additionally calculated for each microphone pair for participants 202 and 204. As described further below, for each participant 202, 204, and 206, the cross correlations for each microphone pair are sampled at the expected delay and a combined score is computed for each participant 202, 204, 206.

Returning to FIGS. 3A-3C, the expected delays for each participant are shown as vertical lines on the cross correlation graph for each microphone pair. Line 302 represents the expected delay for participant 202, line 304 represents the expected delay for participant 202, and line 306 represents the expected delay for participant 206. For each participant, the cross correlations for each microphone pair are sampled at the expected delays at lines 302, 304, and 306 and a combined score is computed for each participant 202, 204, and 206.

To compute the combined score for each participant 202, 204, and 206, scores for the expected delay for each microphone pair are first computed. For each microphone pair cross correlation plot and for the expected delay corresponding to each participant, a value of the closest (nearest) peak that is located uphill (i.e., in a direction of increased correlation strength) from the expected delay is identified and values of the valleys on both sides of the peak (i.e., where the gradient changes sign) are identified. The peak height for the expected delay is calculated as peak−(valley1+valley2)/2, where the peak is the value of the peak, valley1 is the value of a first valley, and valley2 is the value of the second valley.

For example, as illustrated in FIG. 3C, for expected delay at line 306, the cross correlation plot is traversed in the positive direction from the expected delay at line 306 to identify the peak. The cross correlation plot is followed in the negative direction on both sides of the peak to identify valley1 and valley2. A peak height is calculated by subtracting an average of the values of valley1 and valley2 ((valley1+valley2)/2) from the value of the peak.

A score for each expected delay for each participant and each cross correlation for each microphone pair is calculated. To calculate the score, a distance from the expected delay line to the peak for each expected delay is determined. As illustrated in FIG. 3C, the distance between the expected delay at line 306 and the peak is very small. If the distance is greater than a number N, the score is equal to 0. If the distance is not greater than N, the score is calculated using the following formula: score=peak_height*(N−distance)/N, where peak_height is the peak height calculated above. The number N is chosen based on an audio sample rate and a tolerance for mismatch between expected and actual delay of audio arrival to the microphone pair. For example, given a 48 khz audio sample rate, an N value of 10 would give a non-zero score if the actual peak is less than 0.2 milliseconds from the expected peak. Given the speed of sound, this corresponds to roughly a 7 centimeter mismatch between the measured and the expected distance difference from the speaker to the two microphones in the microphone pair.

Although FIGS. 3A-3C illustrate performing a single score calculation for the expected delay at line 306 on the graph representing the cross correlation between microphones 124-1 and 124-3, for the example illustrated in FIG. 2, the score is calculated at each expected delay (e.g., at lines 302, 304, and 306) for each participant 202, 204, and 206 at the cross correlation plot for each microphone pair illustrated in FIGS. 3A-3C. In this example, for each participant, three scores will be computed (i.e., one score for each microphone pair). For each participant, the score is calculated for each cross correlation graph (i.e., for each microphone pair) and the scores are combined to produce a combined score. The combined score for each participant 202, 204, and 206 is compared to an experimentally determined threshold. If the combined score for a participant 202, 204, or 206 is above the experimentally determined threshold, it may be assumed that the participant is speaking.

To describe the process of determining the scores, FIGS. 3A-3C describe determining a score based on plotting cross correlations for microphone pairs and generating vertical lines for at expected delays. However, in some embodiments, the scores may be determined using arrays of numbers instead of a graphical representation.

As discussed above, by sampling the cross correlation values that corresponds to positions where people are known to be, the system provides a more accurate identification of a speaker in a room while being computationally efficient. In other words, resources are saved by sampling the expected delays based on known locations of participants instead of calculating scores at a large set of locations in the room regardless of whether a participant is present.

Once the location of the speaker is determined (based on the combined score for the participant being above the threshold), the location of the speaker may be used as an input to the camera control system 123. The camera framing may be automatically adjusted to ensure that, for example, the speaker is captured by camera 126, that the speaker is tracked by camera 126, or that camera 126 zooms in on the speaker.

Figure 4:
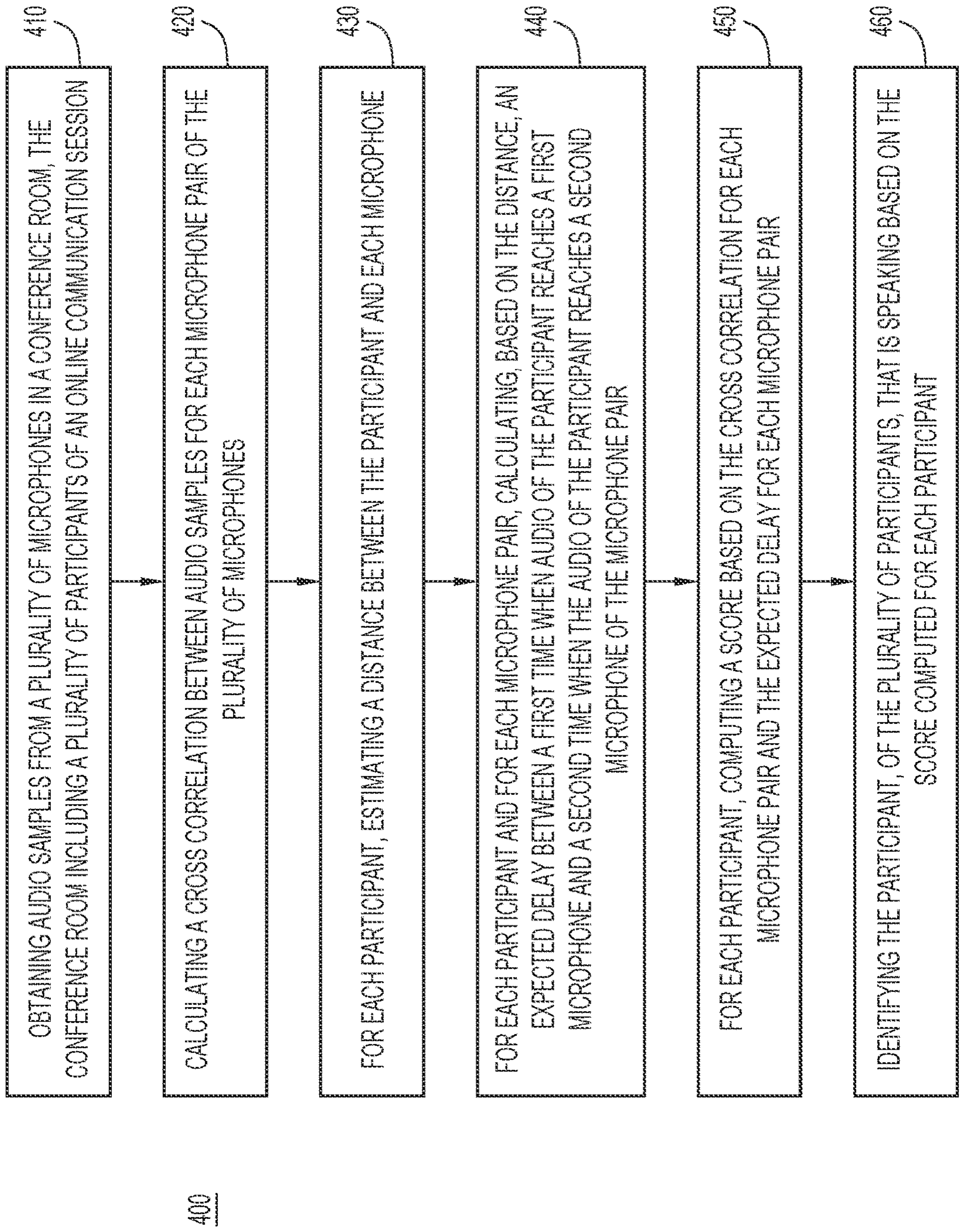
FIG. 4 is a flow diagram illustrating a method of identifying a speaker in a conference room, according to an example embodiment.

Reference is now made to FIG. 4. FIG. 4 is a flow diagram illustrating a method 400 of identifying a speaker in a group of participants in a conference room during an online communication session, according to an embodiment. Method 400 may be performed by videoconference endpoint 120 or another device discussed herein.

At 410, audio samples are obtained from a plurality of microphones in a conference room. The conference room includes a plurality of participants of an online communication session. The microphones are at known positions and orientations in the conference room. At 420, a cross correlation between audio samples for each microphone pair of the plurality of microphone pairs is calculated.

At 430, for each participant, the distance between the participant and each microphone is estimated. For example, the position of each participant may be identified (e.g., using a video feed of the conference room) and the distance between each participant and each microphone may be estimated based on the position. At 440, for each participant and for each microphone pair, an expected delay is calculated. The expected delay is an expected delay between a first time when audio of the participant reaches a first microphone and a second time when the audio of the participant reaches a second microphone of the audio pair.

At 450, for each participant, a score is computed based on the cross correlation for each microphone pair and the expected delay for each microphone pair. For example, a score may be computed for each participant and each expected delay on a cross correlation plot for each microphone pair. The score may be computed based on a height of a peak that is uphill (e.g., in a direction of increased correlation strength) on a graph of the cross correlation from the expected delay and based on a distance from the expected delay to the peak on the graph of the cross correlation. The scores for the cross correlations at each microphone pair may be summed to compute a combined score.

At 460, the participant, of the plurality of participants, that is speaking is identified based on the score computed for each participant. For example, it may be identified that a participant is speaking if the combined score for the participant is above a threshold level. The identification of the participant that is speaking may be used as an input into an automatic camera control system to compose a framing that includes the speaker. For example, a camera in the conference room may automatically follow the speaker, may zoom in on the speaker, or may otherwise compose a frame including the speaker.

Figure 5:
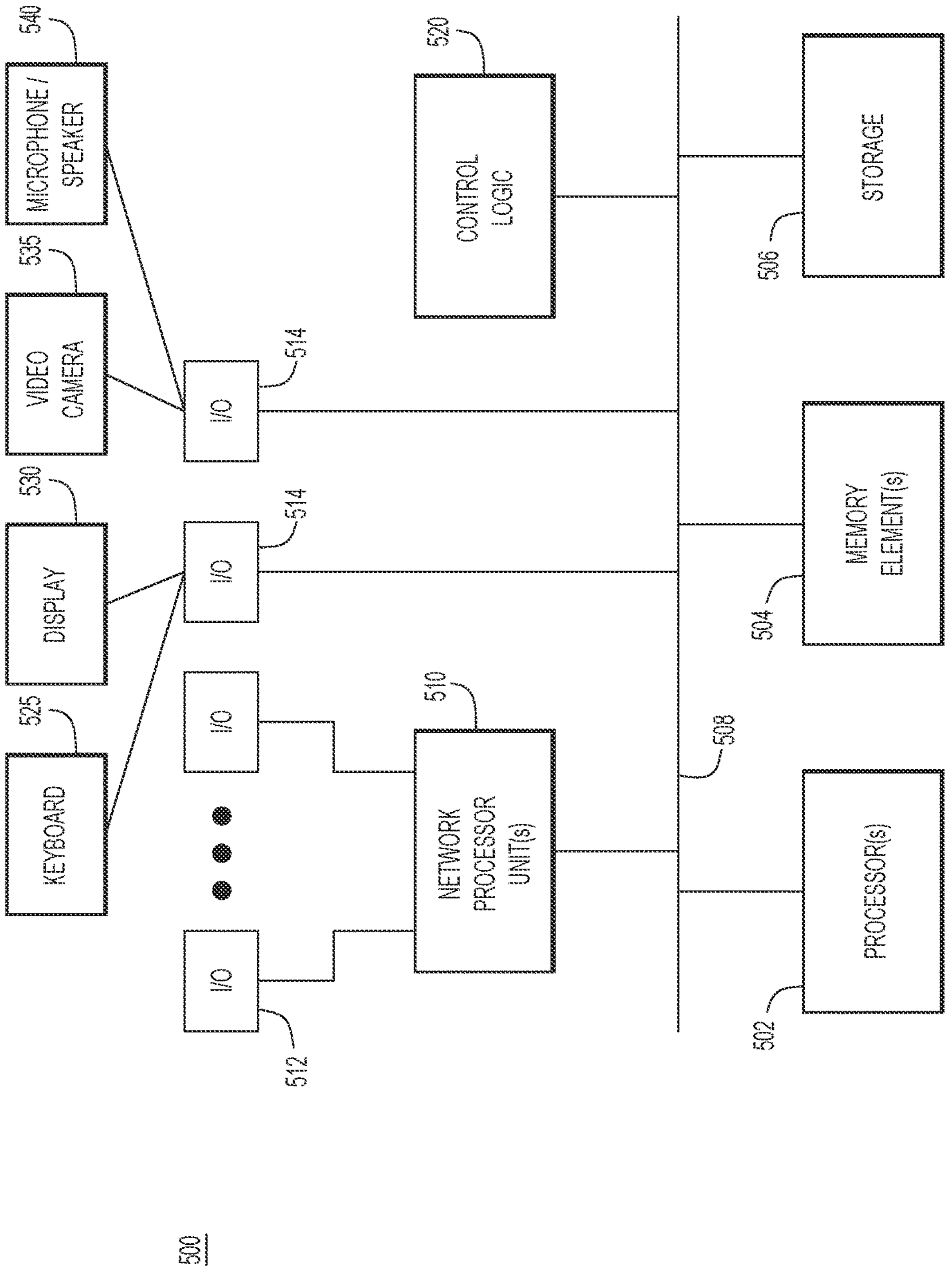
FIG. 5 is a hardware block diagram of a device that may be configured to perform the conference endpoint-based operations involved in identifying a speaker in a conference room, according to an example embodiment.

Referring to FIG. 5, FIG. 5 illustrates a hardware block diagram of a computing/computer device 500 that may perform functions of a video endpoint device or an end device associated with operations discussed herein in connection with the techniques depicted in FIGS. 1, 2, 3A-3C, and 4. In various embodiments, a computing device, such as computing device 500 or any combination of computing devices 500, may be configured as any devices as discussed for the techniques depicted in connection with FIGS. 1, 2, 3A-3C, and 4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element (s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. Examples of wireless communication capabilities include short-range wireless communication (e.g., Bluetooth), wide area wireless communication (e.g., 4G, 5G, etc.). In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array (s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computer device 500. For example, I/O interface(s) 514 may provide a connection to external devices such as a keyboard 525, keypad, a touch screen, and/or any other suitable input and/or output device now known or hereafter developed. This may be the case, in particular, when the computer device 500 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display 530 shown in FIG. 5, particularly when the computer device 500 serves as a user device as described herein. Display 530 may have touch-screen display capabilities. Additional external devices may include a video camera 535 and microphone/speaker combination 540. While FIG. 5 shows the display 530, video camera 535 and microphone/speaker combination 540 as being coupled via one of the I/O interfaces 514, it is to be understood that these components may instead be coupled to the bus 508.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element (s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Figure 6:
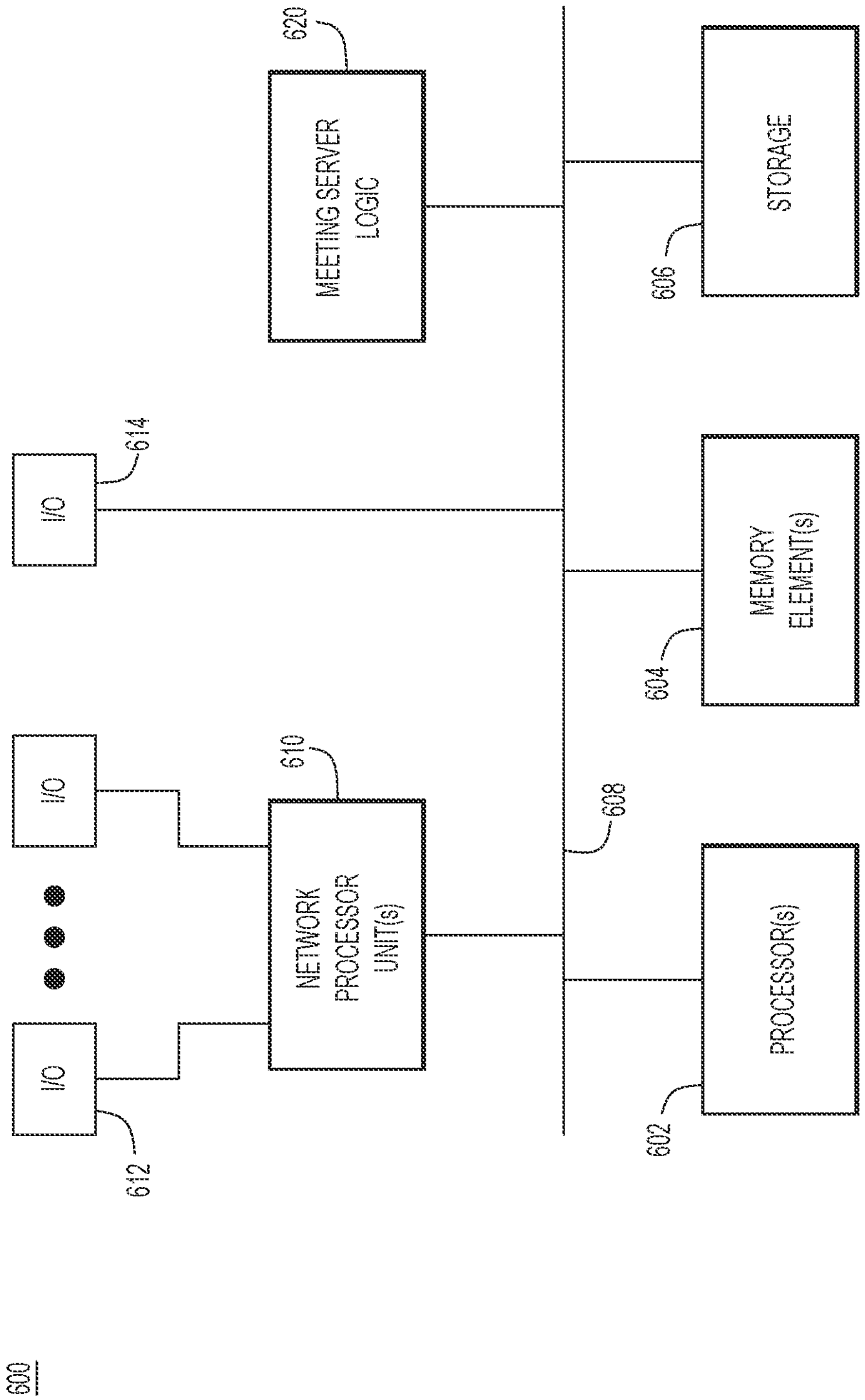
FIG. 6 is a hardware diagram of a computer device that may be configured to perform the meeting server operations involved in identifying a speaker in a conference room during an online videoconference, according to an example embodiment.

FIG. 6 illustrates a block diagram of a computing device 600 that may perform the functions of the meeting server(s) 110 described herein. The computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and meeting server logic 620. In various embodiments, instructions associated with the meeting server logic 620 is configured to perform the meeting server operations described herein, including those depicted by the flow chart for method 400 shown in FIG. 4.

In one form, a computer-implemented method is provided comprising obtaining audio samples from a plurality of microphones in a conference room, the conference room including a plurality of participants of an online communication session; calculating a cross correlation between audio samples for each microphone pair of the plurality of microphones; for each participant, estimating a distance between the participant and each microphone; for each participant and for each microphone pair, calculating, based on the distance, an expected delay between a first time when audio of the participant reaches a first microphone and a second time when the audio of the participant reaches a second microphone of the microphone pair; for each participant, computing a score based on the cross correlation for each microphone pair and the expected delay for each microphone pair; and identifying the participant, of the plurality of participants, that is speaking based on the score computed for each participant.

In one example, computing the score comprises sampling the cross correlation for each microphone pair at the expected delay for each participant; and computing the score based on the sampling. In another example, computing the score comprises identifying, for each microphone pair, values of cross correlations strength as a function of delay; identifying, for each microphone pair, a value of cross correlation strength at the expected delay for each participant; and computing the score for each participant based on the values of cross correlation strength and the expected delays. In another example, computing the score based on the values of cross correlation strength and the expected delays comprises, for each participant: for each microphone pair, calculating a score based on a closest peak value of cross correlation strength from the value of cross correlation strength at the expected delay for the participant; and combining the score for each microphone pair to calculate a combined score. In another example, the method further comprises comparing the combined score to a threshold; and determining that the participant is speaking when the combined score is greater than the threshold.

In another example, the method comprises detecting a position of each participant, of the plurality of participants, in the conference room based on a video stream of the conference room, wherein estimating the distance between the participant and each microphone is based on the position of each participant. In another example, detecting the position of each participant in the conference room comprises: detecting a position and size of a head of each participant; and converting the position and size of the head into a three-dimensional position of each participant based on parameters associated with a camera capturing the video stream. In another example, the method further comprises using an identification of the participant that is speaking as an input into an automatic camera control system to track a speaking participant or zoom in on the speaking participant during the online communication session.

In another form, an apparatus is provided comprising: a memory; a network interface configured to enable network communication; and a processor, wherein the processor is configured to perform operations comprising: obtaining audio samples from a plurality of microphones in a conference room, the conference room including a plurality of participants of an online communication session; calculating a cross correlation between audio samples for each microphone pair of the plurality of microphones; for each participant, estimating a distance between the participant and each microphone; for each participant and for each microphone pair, calculating, based on the distance, an expected delay between a first time when audio of the participant reaches a first microphone and a second time when the audio of the participant reaches a second microphone of the microphone pair; for each participant, computing a score based on the cross correlation for each microphone pair and the expected delay for each microphone pair; and identifying the participant, of the plurality of participants, that is speaking based on the score computed for each participant.

In yet another form, one or more non-transitory computer readable storage media encoded with instructions are provided that, when executed by a processor of a conference endpoint, cause the processor to execute a method comprising: obtaining audio samples from a plurality of microphones in a conference room, the conference room including a plurality of participants of an online communication session; calculating a cross correlation between audio samples for each microphone pair of the plurality of microphones; for each participant, estimating a distance between the participant and each microphone; for each participant and for each microphone pair, calculating, based on the distance, an expected delay between a first time when audio of the participant reaches a first microphone and a second time when the audio of the participant reaches a second microphone of the microphone pair; for each participant, computing a score based on the cross correlation for each microphone pair and the expected delay for each microphone pair; and identifying the participant, of the plurality of participants, that is speaking based on the score computed for each participant.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A computer-implemented method comprising:

obtaining audio samples from a plurality of microphones in a conference room, the conference room including a plurality of participants of an online communication session;

calculating a cross correlation between audio samples for each microphone pair of the plurality of microphones;

detecting a position of each participant, of the plurality of participants, in the conference room based on a video stream of the conference room;

for each participant, estimating a distance between the detected position of the participant and a position of each microphone;

for each participant and for each microphone pair, calculating, based on the distance, an expected delay between a first time when audio of the participant reaches a first microphone of the microphone pair and a second time when the audio of the participant reaches a second microphone of the microphone pair;

for each participant, computing a score based on the cross correlation for each microphone pair and the expected delay for each microphone pair; and identifying the participant, of the plurality of participants, that is speaking based on the score computed for each participant.

2. The computer-implemented method of claim 1, wherein computing the score comprises:

sampling the cross correlation for each microphone pair at the expected delay for each participant; and computing the score based on the sampling.

3. The computer-implemented method of claim 1, wherein computing the score comprises:

identifying, for each microphone pair, values of cross correlations strength as a function of delay;

identifying, for each microphone pair, a value of cross correlation strength at the expected delay for each participant; and computing the score for each participant based on the values of cross correlation strength and the expected delays.

4. The computer-implemented method of claim 3, wherein computing the score based on the values of cross correlation strength and the expected delays comprises:

for each participant:

for each microphone pair, calculating a score based on a closest peak value of cross correlation strength from the value of cross correlation strength at the expected delay for the participant; and combining the score for each microphone pair to calculate a combined score.

5. The computer-implemented method of claim 4, further comprising:

comparing the combined score to a threshold; and determining that the participant is speaking when the combined score is greater than the threshold.

6. The computer-implemented method of claim 1, wherein detecting the position of each participant in the conference room comprises:

detecting a position and size of a head of each participant; and converting the position and size of the head into a three-dimensional position of each participant based on parameters associated with a camera capturing the video stream.

7. The computer-implemented method of claim 1, further comprising:

using an identification of the participant that is speaking as an input into an automatic camera control system to track a speaking participant or zoom in on the speaking participant during the online communication session.

8. An apparatus comprising:

a memory;

a network interface configured to enable network communication; and a processor, wherein the processor is configured to perform operations comprising:

obtaining audio samples from a plurality of microphones in a conference room, the conference room including a plurality of participants of an online communication session;

calculating a cross correlation between audio samples for each microphone pair of the plurality of microphones;

detecting a position of each participant, of the plurality of participants, in the conference room based on a video stream of the conference room;

for each participant, estimating a distance between the position of the participant and a position of each microphone;

for each participant and for each microphone pair, calculating, based on the distance, an expected delay between a first time when audio of the participant reaches a first microphone of the microphone pair and a second time when the audio of the participant reaches a second microphone of the microphone pair;

for each participant, computing a score based on the cross correlation for each microphone pair and the expected delay for each microphone pair; and identifying the participant, of the plurality of participants, that is speaking based on the score computed for each participant.

9. The apparatus of claim 8, wherein, when computing the score, the processor is further configured to perform operations comprising:

sampling the cross correlation for each microphone pair at the expected delay for each participant; and computing the score based on the sampling.

10. The apparatus of claim 8, wherein, when computing the score, the processor is further configured to perform operating comprising:

identifying, for each microphone pair, values of cross correlation strength as a function of delay;

identifying, for each microphone pair, a value of cross correlation strength at the expected delay for each participant; and computing the score for each participant based on the values of cross correlation strength and the expected delays.

11. The apparatus of claim 10, wherein computing the score based on the values of cross correlation strength and the expected delays, the processor is further configured to perform operating comprising:

for each participant:

for each microphone pair, calculating a score based on a closest peak value of cross correlation strength from the value of cross correlation strength at the expected delay for the participant; and combining the score for each microphone pair to calculate a combined score.

12. The apparatus of claim 11, wherein the processor is further configured to perform operations comprising:

comparing the combined score to a threshold; and determining that the participant is speaking when the combined score is greater than the threshold.

13. The apparatus of claim 8, wherein, when detecting the position of each participant in the conference room, the processor is further configured to perform operations comprising:

detecting a position and size of a head of each participant; and converting the position and size of the head into a three-dimensional position of each participant based on parameters associated with a camera capturing the video stream.

14. The apparatus of claim 8, wherein the processor is further configured to perform operations comprising:

using an identification of the participant that is speaking as an input into an automatic camera control system to track a speaking participant or to zoom in on the speaking participant during the online communication session.

15. One or more non-transitory computer readable storage media encoded with instructions that, when executed by a processor of a conference endpoint, cause the processor to execute a method comprising:

obtaining audio samples from a plurality of microphones in a conference room, the conference room including a plurality of participants of an online communication session;

calculating a cross correlation between audio samples for each microphone pair of the plurality of microphones;

detecting a position of each participant, of the plurality of participants, in the conference room based on a video stream of the conference room;

for each participant, estimating a distance between the detected position of the participant and a position of each microphone;

for each participant and for each microphone pair, calculating, based on the distance, an expected delay between a first time when audio of the participant reaches a first microphone of the microphone pair and a second time when the audio of the participant reaches a second microphone of the microphone pair;

for each participant, computing a score based on the cross correlation for each microphone pair and the expected delay for each microphone pair; and identifying the participant, of the plurality of participants, that is speaking based on the score computed for each participant.

16. The one or more non-transitory computer readable storage media of claim 15, wherein computing the score further comprises:

sampling the cross correlation for each microphone pair at the expected delay for each participant; and computing the score based on the sampling.

17. The one or more non-transitory computer readable storage media of claim 15, wherein computing the score further comprises:

identifying, for each microphone pair, values of cross correlation strength as a function of delay;

identifying, for each microphone pair, a value of cross correlation strength at the expected delay for each participant; and for each participant:

for each microphone pair, calculating a score based on a closest peak value of cross correlation strength from the value of cross correlation strength at the expected delay for the participant; and
combining the score for each microphone pair to calculate a combined score.

18. The one or more non-transitory computer readable storage media of claim 17, the method further comprising:
comparing the combined score to a threshold; and
determining that the participant is speaking when the combined score is greater than the threshold.

19. The one or more non-transitory computer readable storage media of claim 15, wherein detecting the position of each participant in the conference room further comprises:
detecting a position and size of a head of each participant; and
converting the position and size of the head into a three-dimensional position of each participant based on parameters associated with a camera capturing the video stream.

20. The one or more non-transitory computer readable storage media of claim 15, the method further comprising:
using an identification of the participant that is speaking as an input into an automatic camera control system to track a speaking participant or to zoom in on the speaking participant during the online communication session.

* * * * *